United States Patent [19]

Marsala et al.

[11] Patent Number: 4,879,879

[45] Date of Patent: Nov. 14, 1989

[54] APPARATUS FOR CONTROLLING A THERMOSTATIC EXPANSION VALVE

[76] Inventors: Joseph Marsala, 711 Wellman Ave., North Chelmsford, Mass. 01863; Melvin M. Winters, 2028 Rocky Weed Rd., Berrien Springs, Mich. 49103

[21] Appl. No.: 253,715

[22] Filed: Oct. 5, 1988

[51] Int. Cl.$^4$ .................... G05D 23/30; G05D 15/00
[52] U.S. Cl. .................................. 62/202; 62/225; 236/68 B
[58] Field of Search .................. 62/3, 202, 225, 212; 236/68 B

[56] References Cited

U.S. PATENT DOCUMENTS

| | | | |
|---|---|---|---|
| 2,807,151 | 9/1957 | Baker | 62/8 |
| 2,936,125 | 5/1960 | Leins | 236/68 B |
| 3,157,801 | 11/1964 | Shequen | 236/68 B X |
| 3,196,685 | 7/1965 | Leigh et al. | 236/68 B X |
| 3,237,415 | 3/1966 | Newton | 62/3 |
| 3,638,446 | 2/1972 | Palmer | 62/202 |
| 4,441,329 | 4/1984 | Dawley | 62/126 |
| 4,467,613 | 8/1984 | Behr et al. | 62/115 |
| 4,651,535 | 3/1987 | Alsenz | 62/225 |

OTHER PUBLICATIONS

Ashrae 1988 Equipment Handbook, pp. 19.2–19.8.
Wirgau, Appliance Engineer, Aug. 1984, pp. 52–55.
Miller, Air Conditioning/Heating and Refrigeration News, Dec. 24, 1984.

Primary Examiner—William E. Wayner
Attorney, Agent, or Firm—Wolf, Greenfield & Sacks

[57] ABSTRACT

Apparatus for controlling a heating or cooling system of the type that includes an evaporator and a thermostatic expansion valve having a thermostatic bulb. The control apparatus comprises a thermoelectric heat pump device responsive to an electrical control signal for controlling transfer of thermal energy to and from the thermostatic bulb, at least one temperature sensing device associated with the heating or cooling system, and an electronic control circuit. The control circuit is responsive to the sensed temperature to provide the electrical control signal to the thermoelectric device for maintaining a desired operating condition of the evaporator. The thermoelectric device acts as a gate or heat pump for controlling flow of thermal energy to and from the thermostatic bulb with a relatively small amount of electrical energy input. Preferably, the thermoelectric heat pump device is positioned between the thermostatic bulb and the suction line of the evaporator so as to control transfer of thermal energy between the suction line and the thermostatic bulb. Preferably, the control apparatus senses the temperature difference between the suction line and the inlet line of the evaporator and maintains the temperature difference within prescribed limits.

27 Claims, 3 Drawing Sheets

APPARATUS FOR CONTROLLING A THERMOSTATIC EXPANSION VALVE

FIELD OF THE INVENTION

This invention relates generally to heating and cooling systems, including heat pumps, air conditioners and refrigeration systems, and, more particularly, to electronic apparatus for controlling thermostatic expansion valves that are utilized in such systems.

BACKGROUND OF THE INVENTION

Heating and cooling systems such as heat pumps, air conditioners and refrigeration systems normally include an evaporator having an inlet line for receiving a liquid refrigerant from a condenser and an outlet line, or suction line, for carrying the vaporized refrigerant to a compressor. As refrigerant passes through the evaporator, it is converted by heat absorbed from the surroundings from liquid form to a vapor. Devices utilized to meter flow of refrigerant through the inlet line into the evaporator include the thermostatic expansion valve, the short tube orifice and the capillary tube. The thermostatic expansion valve includes a flow control valve that is opened or closed by a diaphragm, and a thermostatic bulb connected to the valve by a capillary tube. The thermostatic bulb and the interconnecting tube contain a thermally sensitive charge. Many types of charges are used in thermostatic expansion valve bulbs. Examples of charges include liquid and liquid cross-charges, as and gas cross-charges and adsorption charges. When the thermostatic bulb is heated or cooled, the pressure of the charge acts on the diaphragm and opens or closes the valve. Further details regarding thermostatic expansion valves are provided in the ASHRAE 1988 *Equipment Handbook*, pages 19.2-19.8.

In a conventional system, the valve portion of the thermostatic expansion valve is located in the inlet line to the evaporator and the thermostatic bulb is in thermal contact with the suction line, so that the flow of refrigerant into the evaporator is controlled in response to the temperature of the refrigerant vapor in the suction line. Typically, for low pressure drop evaporators, the vapor in the suction line is several degrees warmer than the liquid refrigerant entering the evaporator through the inlet line. The term "superheat" means raising the temperature of the refrigerant vapor above the temperature required to change the refrigerant from a liquid to a vapor at a specified pressure level. For low pressure drop evaporators, the superheat is approximately equal to the difference in temperature between the vapor in the suction line and the refrigerant in the inlet line. Typically, a superheat on the order of 8°-20° F. is required for proper operation of a thermostatic expansion valve. If the superheat drops below a prescribed value, indicating that the refrigerant is not being fully evaporated, the thermostatic expansion valve reduces the flow of refrigerant into the evaporator until the superheat returns to the prescribed value. Conversely, when the superheat exceeds the prescribed value, indicating that the refrigerant vapor is being overheated, the thermostatic expansion valve increases the flow of refrigerant into the evaporator.

Various problems have been associated with systems wherein a thermostatic expansion valve is used to control the flow of refrigerant into an evaporator. The superheat required for operation of the thermostatic expansion valve is a source of inefficiency. In order to provide the prescribed value of superheat, a portion of the evaporator near the suction line contains refrigerant vapor rather than liquid refrigerant. This portion of the evaporator operates less efficiently than the portion which contains a liquid refrigerant, since the heat transfer coefficient to a vapor is lower than to a liquid. Ideally, the entire evaporator should contain liquid refrigerant, and the refrigerant leaving the evaporator through the suction line should be fully vaporized. Liquid refrigerant passing through the suction line can potentially damage the compressor. Therefore, in an optimized system, the superheat should be reduced as much as possible without permitting liquid refrigerant to reach the compressor.

A further problem associated with thermostatic expansion valves is known as "hunting," which results from the time delay inherent in the control system. When the thermostatic expansion valve changes the rate of refrigerant flow, there is a time delay before the refrigerant is evaporated and causes a change in the sensed superheat. As a result, the system oscillates between a superheat above the desired value and a superheat below the desired value. This results in operating inefficiencies and inaccurate temperature control, and can potentially permit flow of liquid refrigerant to the compressor.

The prior art contains various proposals for dealing with the above-described problems and other problems associated with thermostatic expansion valves. A thermal electric expansion valve is disclosed by Wirgau in "Development of A Thermal Electric Expansion Valve," *Appliance Engineer*, Aug. 1984, pp. 52-55. The valve is electrically controlled by a thermistor positioned on the evaporator suction line. Other electrically-controlled expansion valves are disclosed by Miller in "Electronic Expansion Valve Offers More Precise Control In A/C, Refrigeration Systems," *Air Conditioning/Heating and Refrigeration News*, Dec. 2, 1984, and in U.S. Pat. No. 4,651,535 issued Mar. 24, 1987 to Alsenz. A solenoid flow control valve is controlled by a pulsewidth modulated control signal in which the duty cycle determines the flow rate through the valve. The Miller article describes microprocessor control of the solenoid control valve. In such configurations, the thermostatic bulb is eliminated. While such configurations have certain advantages, they have not found widespread use.

In U.S. Pat. No. 4,467,613 issued Aug. 28, 1984 to Behr et al, the superheat setting of a thermostatic expansion valve is automatically adjusted by an electric heater which biases the thermostatic bulb in response to a refrigeration parameter such as compressor lubricant temperature. While such configuration can reduce the superheat associated with the evaporator, significant energy is required to heat the thermostatic bulb with a resistance heater. U.S. Pat. No. 3,638,446 issued Feb. 1, 1972 to Palmer and U.S. Pat. No. 2,807,151 issued Sept. 24, 1957 to Baker also disclose cooling systems wherein the thermostatic bulb of a thermostatic expansion valve is heated with a resistance heater.

U.S. Pat. No. 4,441,329 issued Apr. 10, 1984 to Dawley discloses a refrigerator temperature control system including computer-controlled thermoelectric modules for heating or cooling temperature sensors during a sensor integrity test cycle. U.S. Pat. No. 3,237,415 issued Mar. 1, 1966 to Newton discloses a zone-controlled refrigeration system wherein thermoelectric units are utilized in each zone to directly control temperature.

It is a general object of the present invention to provide improved heat pump, air conditioning and refrigeration systems.

It is another object of the present invention to provide improved apparatus for controlling a thermostatic expansion valve.

It is a further object of the present invention to provide improved apparatus for controlling the flow of refrigerant to an evaporator in a heating or cooling system.

It is a further object of the present invention to increase the energy efficiency of heat pumps, air conditioners and refrigeration systems.

It is a further object of the present invention to provide apparatus for controlling a thermostatic expansion valve wherein hunting is eliminated.

It is yet another object of the present invention to provide control apparatus capable of heating and cooling the thermostatic bulb of a thermostatic expansion valve at different times.

It is another object of the present invention to provide apparatus including a thermoelectric heat pump device for controlling a thermostatic expansion valve.

It is another object of the present invention to provide apparatus for controlling a thermostatic expansion valve, which is easily adaptable for use in a variety of heat pump, air conditioning and refrigeration systems.

It is a further object of the present invention to provide apparatus for controlling a thermostatic expansion valve, which is low in cost and easy to manufacture.

It is a further object of the present invention to provide apparatus for controlling a thermostatic expansion valve having the capability to rapidly close the valve by active cooling of the thermostatic bulb.

It is a further object of the present invention to provide apparatus for controlling a thermostatic expansion valve having the capability to rapidly open the valve by active heating of the thermostatic bulb.

It is yet another object of the present invention to provide apparatus for controlling a thermostatic expansion valve having a combination of the above features.

SUMMARY OF THE INVENTION

According to the present invention, these and other objects and advantages are achieved in apparatus for controlling a heating or cooling system of the type including an evaporator having an inlet line and a suction line, and a thermostatic expansion valve including a valve in the inlet line and a thermostatic bulb coupled to the valve. In accordance with the invention, the apparatus comprises a thermoelectric heat pump device responsive to an electrical control signal for controlling transfer of thermal energy to and from the thermostatic bulb, means for sensing at least one temperature associated with the heating or cooling system, and electronic control means responsive to the sensed temperature for providing the electrical control signal to the thermoelectric device for maintaining a desired operating condition of the evaporator. The thermoelectric device acts as a gate or heat pump for controlling flow of thermal energy to and from the thermostatic bulb with a relatively small amount of electrical energy input.

In a preferred embodiment, the thermoelectric heat pump device is positioned between the thermostatic bulb and the suction line so as to control transfer of thermal energy between the suction line and the thermostatic bulb. Shaped thermal contact elements can be utilized to enhance thermal contact between the thermoelectric device and the suction line and between the thermoelectric device and the thermostatic bulb. The assembly is preferably surrounded with insulation so that the thermostatic bulb is not affected by ambient temperature variations.

The sensing means, in a preferred embodiment, includes a first temperature sensor in thermal contact with the evaporator inlet line and a second temperature sensor in thermal contact with the evaporator suction line, and the electronic control means includes means responsive to the first and second temperature sensors for determining a temperature difference between the suction line and the inlet line. The electronic control means can include means for causing the thermoelectric device to cool the thermostatic bulb when the temperature difference is less than a first predetermined value, and for causing the thermoelectric device to heat the thermostatic bulb when the temperature difference is greater than a second predetermined value. The electronic control means can include means for causing the thermoelectric device to cool the thermostatic bulb, so that refrigerant flow is cut off when the evaporator is not in operation. Alternatively, the electronic control means can include means for causing the thermoelectric device to heat the thermostatic bulb, so that the thermostatic expansion valve is opened when the evaporator is not in operation.

In another preferred embodiment, the sensing means comprises means for sensing a temperature in a zone being controlled by the heating or cooling system. The apparatus accurately controls temperature in the zone where the temperature is sensed.

According to another aspect of the invention, the electronic control means includes a microprocessor responsive to the sensing means. The electronic control means preferably further includes a driver circuit responsive to an output from the microprocessor for providing the electrical control signal to the thermoelectric heat pump device. The driver circuit is responsive to a first state of the output from the microprocessor for supplying a current of one polarity to the thermoelectric device and is responsive to a second state of the output from the microprocessor for supplying a current of the opposite polarity to the thermoelectric device. The microprocessor permits the control apparatus to be easily adapted to different types and sizes of heating and cooling systems.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
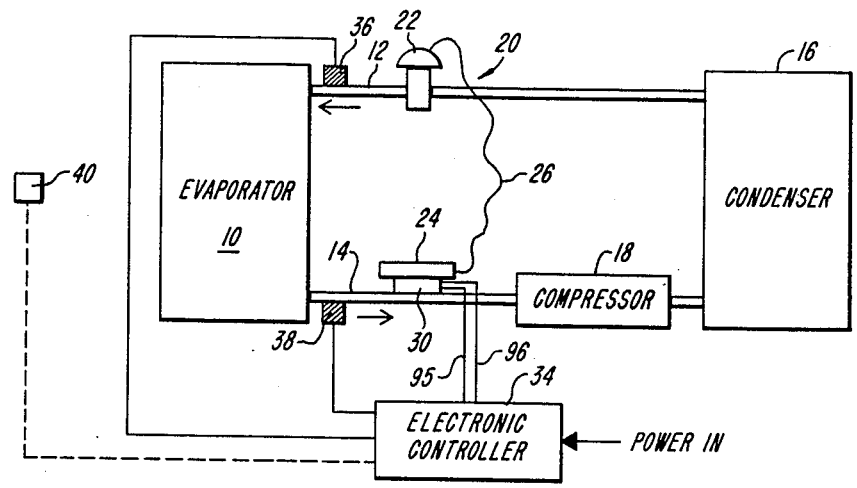
FIG. 1 is a block diagram of a heating or cooling system incorporating the present invention.

A block diagram of a heating or cooling system incorporating the control apparatus of the present invention is shown in FIG. 1. The system includes an evaporator 10, typically including an evaporator coil and means for directing warm air across the evaporator coil. The evaporator 10 has an inlet line 12 for receiving liquid refrigerant and an outlet line, or suction line, 14 through which refrigerant vapor is exhausted. The evaporator 10 receives liquid refrigerant through inlet line 12 from a condenser 16 and vaporizes the refrigerant. The vapor from evaporator 10 is carried through suction line 14 to the inlet of a compressor 18. The outlet of the compressor 18 is coupled to the condenser 16.

The system further includes a thermostatic expansion valve 20 for metering the flow of refrigerant through inlet line 12 to evaporator 10. The thermostatic expansion valve 20 includes a flow control valve 22, a thermostatic bulb 24 and a capillary tube 26 interconnecting the valve 22 and the thermostatic bulb 24. Thermostatic expansion valves are conventionally used in heat pumps, air conditioners and water chillers of all sizes for residential, commercial and industrial use, and in refrigeration equipment such as refrigerated display cases, coolers, icemakers, freezers, transportation refrigeration devices and certain types of automobile air conditioners.

In accordance with the present invention, apparatus is provided for controlling transfer of thermal energy to and from the thermostatic bulb 24. The control apparatus of the invention can be utilized in any heating or cooling system that utilizes a thermostatic expansion valve. A thermoelectric heat pump device 30, also commonly known as a Peltier device, is positioned in thermal contact with thermostatic bulb 24. Preferably, but not necessarily, the thermoelectric device 30 is positioned between suction line 14 and thermostatic bulb 24 so as to control flow of thermal energy between suction line 14 and thermostatic bulb 24. Thermoelectric device 30 controls both the rate and direction of heat flow to the bulb 24. Small quantities of heat are supplied to or taken away from the bulb 24, thereby compensating for losses or gains to or from the ambient environment through insulation placed around the assembly, as described hereinafter. The thermoelectric device 30 is a solid state device, typically having two flat surfaces on opposite sides thereof and a pair of electrical terminals. When a d.c. voltage is applied to the terminals, one surface of the device gets cold while the other surface gets hot. Reversing the polarity of the applied voltage reverses the direction of heat flow. Such devices are commercially available from Melcor, 990 Spruce Street, Trenton, N.J. 08648.

The thermoelectric device 30 receives energizing current from an electronic controller 34, which typically includes a microprocessor. Electronic controller 34 receives inputs from one or more temperature sensors associated with the heating or cooling system. In a preferred embodiment illustrated in FIG. 1, a temperature sensor 36 is located in thermal contact with inlet line 12, and a temperature sensor 38 is located in thermal contact with suction line 14. Each of the temperature sensors 36, 38 is electrically coupled to electronic controller 34. The difference between the suction line 14 and inlet line 12 temperatures is calculated by electronic controller 34. The electronic controller 34, during normal operation, supplies to thermoelectric device 30 the current necessary to maintain a desired temperature difference.

It will be understood that the control apparatus of the invention is not limited to the sensor configuration shown in FIG. 1. For example, any number of temperature sensors can be placed at desired positions on the inlet line 12, the suction line 14 or the evaporator 10 to sense operating temperatures. Also, a temperature sensor 40, shown by broken lines in FIG. 1, can be positioned in a zone that is controlled by the heating or cooling system and where temperature control is critical. For example, the sensor 40 can be placed within a refrigerated display case to insure that a desired temperature is maintained.

Figure 2:
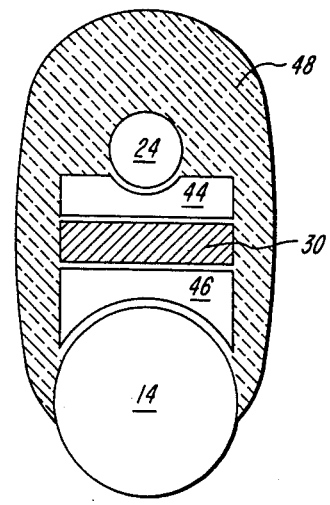
FIG. 2 is a cross sectional view of an assembly for mounting a thermoelectric heat pump device and a thermostatic bulb to an evaporator suction line.

A cross-sectional view of a mounting assembly for the thermostatic bulb 24, the thermoelectric device 30 and the suction line 14 is shown in FIG. 2. Thermoelectric device 30 typically has flat surfaces, whereas the thermostatic bulb 24 and the suction line 14 have curved surfaces. Thermal contact elements are used to establish low thermal resistance contacts between these elements. A first thermal contact element 44 is positioned between thermoelectric element 30 and thermostatic bulb 24, and a second thermal contact element 46 is positioned between thermoelectric device 30 and suction line 14. The element 44 has a flat surface for contacting thermoelectric element 30 and a curved surface shaped to match thermostatic bulb 24. Similarly, element 46 has a flat surface for contact with thermoelectric element 30 and a curved surface for contact with suction line 14. The thermal contact elements 44, 46 can, for example, be aluminum extrusions. The entire assembly is surrounded with insulation 48 in order to minimize transfer of thermal energy between thermostatic bulb 24 and the ambient environment. The assembly shown in FIG. 2 is conveniently made slightly longer than the thermostatic bulb 24.

Figure 3:
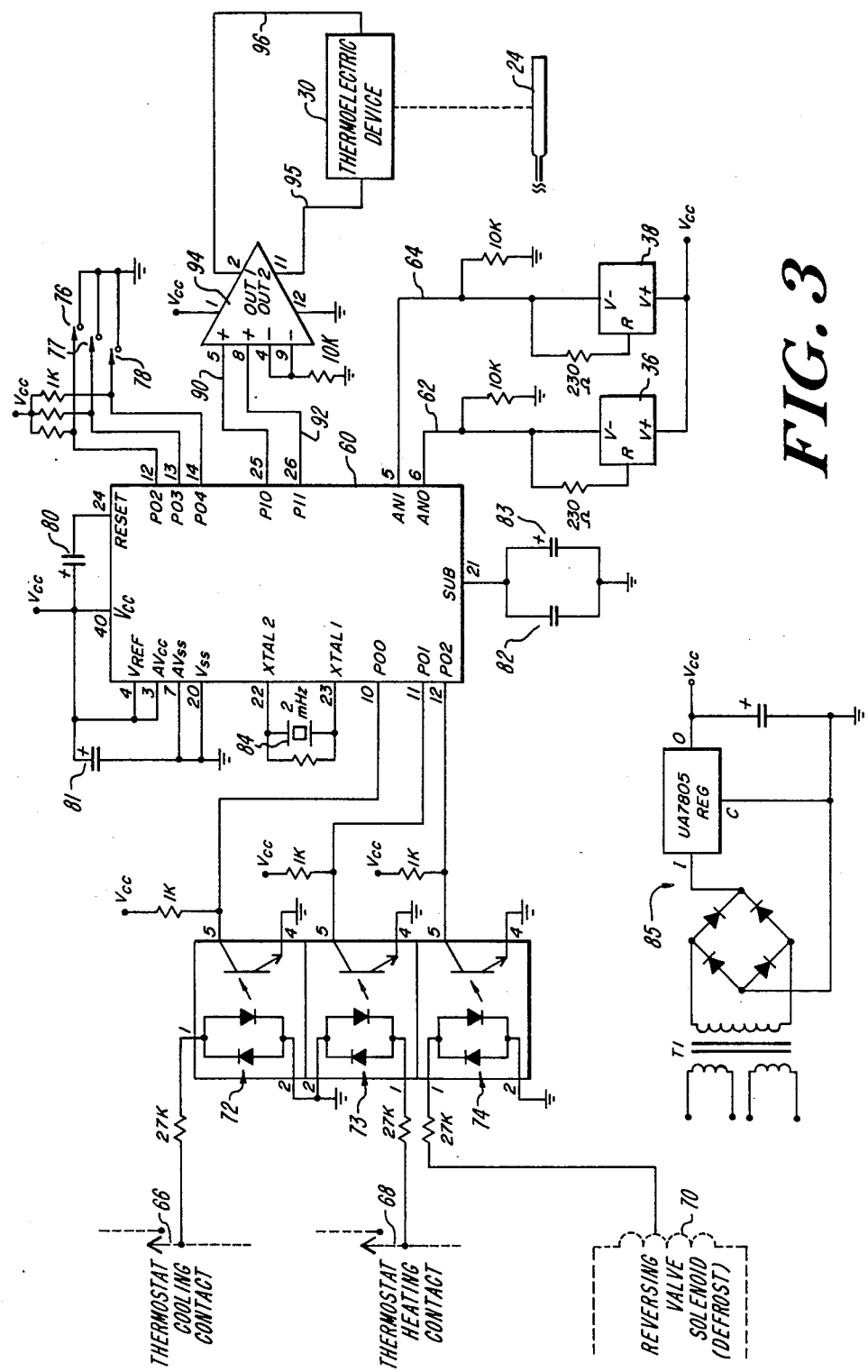
FIG. 3 is a schematic diagram of the control apparatus of the present invention.

A schematic diagram of one example of the electronic controller 34 is shown in FIG. 3. The electronic controller 34 shown in FIG. 3 is suitable for a residential or light commercial heat pump. Different digital and analog inputs to the controller will be used for different applications. In a preferred embodiment, the electronic controller 34 includes a microprocessor so that a single circuit structure can be utilized in a wide variety of applications by reprogramming the microprocessor. A microprocessor 60 receives analog input signals from temperature sensors 36 and 38 on lines 62 and 64, respectively. In a preferred embodiment, temperature sensors 36, 38 are type LM234, manufactured by National Semiconductor, and the microprocessor is a type $\mu$PD8022, manufactured by NEC. The type $\mu$PD8022 includes two built-in analog-to-digital converters, thereby permitting direct input of analog signals from temperature sensors 36 and 38.

The microprocessor 60 also receives digital control signal inputs. A thermostat cooling contact 66, a thermostat heating contact 68 and a reversing valve solenoid 70 associated with a defrost cycle are coupled through optical isolators 72, 73, 74, respectively, to digital inputs of microprocessor 60. The optical isolators 72, 73, 74 prevent noise spikes, interference or high voltages picked up on the lines from the remote switch contacts from damaging the microprocessor 60. The thermostat contacts 66, 68 indicate whether the system is in an operating or standby mode and whether the system is heating or cooling, while the input from reversing valve solenoid 70 selects a routine suitable for a defrost cycle.

Optional mode switches 76, 77, 78 are coupled to additional digital inputs of microprocessor 60. The mode switches 76, 77, 78 can be utilized to activate different operating routines. For example, different temperature set points can be selected at different times of day. Also, the microprocessor 60 can be programmed to respond to different temperature sensors in different modes. It will be understood that the inputs provided by mode switches 76, 77, 78 are not necessarily manual, but can be supplied from a remote computer for automatic control of the microprocessor 60. Additional conventional elements of the microprocessor circuit include decoupling capacitors 80, 81, 82 and 83, clock crystal 84 and power supply 85.

Digital outputs of the microprocessor 60 are supplied on lines 90 and 92 to a driver circuit 94. The driver circuit 94 supplies operating current to the thermoelectric device 30 on lines 95 and 96. In a preferred embodiment, the driver circuit 94 is a type ECG1619, manufactured by North American Philips. The preferred circuit accepts digital inputs on lines 90 and 92 and provides d.c. output current of one polarity or of the opposite polarity on lines 95 and 96 to drive thermoelectric device 30. When lines 90 and 92 are both at a low logic level, no current is supplied to thermoelectric device 30. When line 90 is at a high logic level, current is supplied to thermoelectric device 30 in one direction, and when line 92 is at a high logic level, current is supplied to thermoelectric device 30 in the opposite direction. In a preferred operating mode, pulse width modulated power is supplied to thermoelectric device 30. Pulses of one polarity are supplied to thermoelectric device 30 for heating, and pulses of the opposite polarity are supplied for cooling. The amount of heating or cooling is determined by the on-off duty cycle of the pulses. In a preferred embodiment, the thermoelectric device 30 is a type CP1.0-71-05L, manufactured by Melcor, and requires an operating current on the order of 1.5 amps at 5 volts.

The microprocessor circuit shown in FIG. 3 and described hereinabove is easily adapted to a variety of different configurations for control of a thermostatic expansion valve. As noted above, any desired number of temperature sensors can be utilized in selected locations. The readings from the temperature sensors can be processed according to any desired algorithm, and one or more threshold levels can be established. When a timer is utilized, different thresholds can be employed at different times, such as for day and night operation. The microprocessor can have selectable operating modes and can be controlled by a remote computer or other controller.

Figure 4:
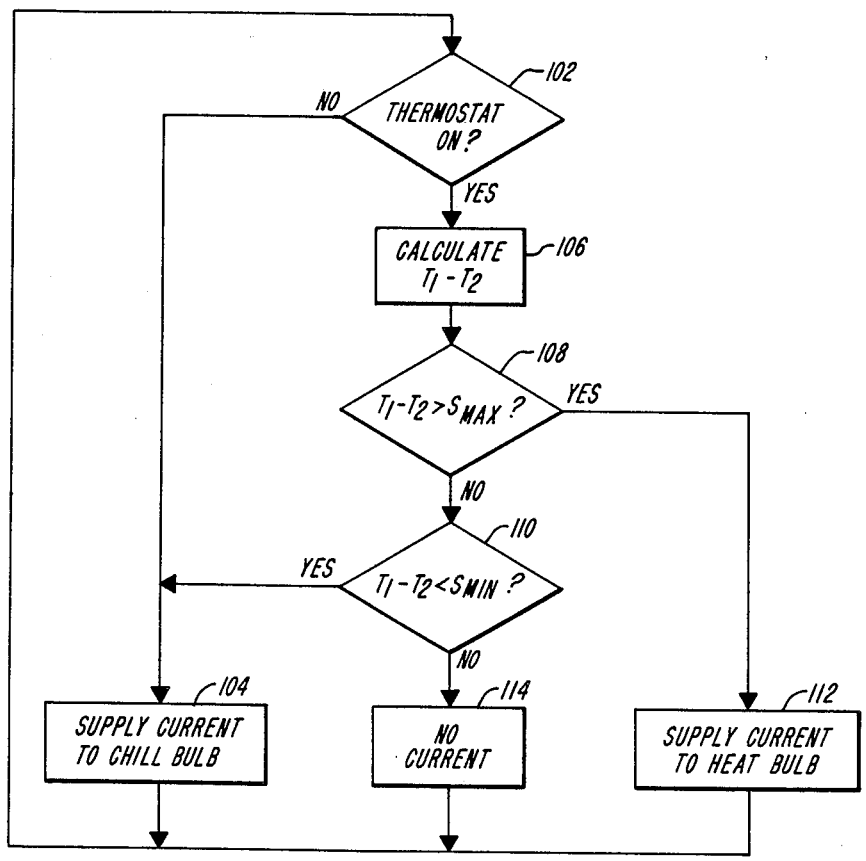
FIG. 4 is a flow diagram of a routine for controlling a thermostatic expansion valve in accordance with the present invention.

A flow diagram of one example of a simple but effective control algorithm is shown in FIG. 4. The microprocessor 60 checks the inputs from thermostat contacts 66, 68 in step 102 to determine if the system is in operation. When the thermostat is off, the microprocessor 60 in step 104 provides the necessary logic levels on lines 90 and 92 to cause driver 94 to energize thermoelectric device 30 so as to chill the thermostatic bulb 24. The chilling of bulb 24 closes valve 22 so that the flow of refrigerant to evaporator 10 is cut off.

When the thermostat is on, the microprocessor 60 in step 106 obtains temperature readings $T_2$ and $T_1$ from sensors 36 and 38, respectively, and calculates the difference, $T_1-T_2$, the evaporator superheat. In steps 108 and 110, the microprocessor 60 compares the superheat $T_1-T_2$ with predetermined limits. In the present example, the superheat is required to be between an upper limit $S_{max}$ and a lower limit $S_{min}$. When $T_1-T_2$ is greater than $S_{max}$, the microprocessor 60 causes driver 94 to supply current to thermoelectric device 30 so as to heat thermostatic bulb 24 in step 112. When the bulb 24 is heated, valve 22 increases the flow of refrigerant to evaporator 10 until the temperature at the suction line 14 is reduced. When the superheat $T_1-T_2$ is below the lower limit $S_{min}$, the microprocessor 60 causes driver 94 to supply current to thermoelectric device 30 so as to chill thermostatic bulb 24 in step 104. When bulb 24 is chilled, valve 22 reduces the flow of refrigerant into evaporator 10 until the evaporator 10 is able to fully evaporate all incoming refrigerant and reach the desired range of superheats. When the superheat $T_1-T_2$ is within the desired range between $S_{max}$ and $S_{min}$, no current is supplied to the thermoelectric device 30 (step 114). The routine then returns for checking of the thermostat in step 102.

In some systems with compressor motors that have a low starting torque, the thermostatic expansion valve 20 is opened when the evaporator 10 is not in operation. In this case, the flow diagram of FIG. 4 is suitably modified to produce heating of the thermostatic bulb when the thermostat is off.

The control apparatus shown and described herein has numerous advantages over the prior art. Hunting is eliminated by implementing in microprocessor 60 a selected time delay between sensing and acting on the thermostatic bulb 24. Conventional thermostatic expansion valves have a tendency to hunt or control erratically when the time between sensing the bulb temperature change and valve actuation is outside the stable operating range. Since delay can easily be built into the microprocessor 60, erratic control tendencies can be damped out of the system.

The ability of the control apparatus to chill the thermostatic bulb 24 below the temperature of suction line 14 is an important feature of the invention. Improvements resulting from the ability to chill the bulb 24 include:

(1) Better cycling performance is obtained due to refrigerant isolation during the off cycle. As the bulb 24 is chilled below suction line 14 temperature in the off state, the thermostatic expansion valve closes, thereby isolating the refrigerant in the high and low pressure sides of the machine. Pressures do not equalize, and, since the bulb is chilled even after the suction line 14 has become warmed, the start of the subsequent cycle does not spill the entire quantity of liquid refrigerant into the evaporator 10. Instead, after starting, the bulb 24 is warmed slowly by the thermoelectric device 30, causing the low pressure side to rapidly reduce to standard operating pressure by means of the compressor 18. Rapid evaporator temperature pull-down is a desirable energy-saving feature in refrigeration and air conditioning systems.

(2) The same rapid pull-down obtained by chilling the bulb 24 below suction line 14 temperature also shortens the defrost cycle recovery time of a heat pump. Since defrosting is a major source of inefficiency in heat pump operation, any shortening of the defrost cycle improves system performance.

(3) Flood-back of refrigerant to the compressor 18 during the off cycle and on startup is reduced or eliminated by keeping the bulb 24 chilled, thereby improving compressor life.

Microprocessor control of the thermoelectric device 30 permits a variety of different operating modes, all of which represent improvements over the prior art.

(1) Reduced operating superheats can be programmed over the entire operating range of the refrigeration system. Constant low superheat versus capacity can be programmed. This improvement is most desirable for heat pumps in the heating mode where the evaporator temperature must follow ambient over a wide range of temperatures.

(2) A constant evaporator temperature or a constant low temperature can be maintained at nearly any system capacity. This improvement relates to refrigerated cases, ice makers and coolers where evaporator temperature and product temperature are important.

(3) Many refrigeration systems, such as those in convenience stores, take advantage of cooler outside temperatures by allowing condenser pressures to fall with falling ambient temperatures instead of artificially keeping them high. This saves on energy to the compressor, but reduces the pressure at the inlet to the expansion valve. A constant high pressure is required for consistent control. The present invention permits the condenser pressure to fall and yet maintains full control at the expansion valve. The thermoelectric device can heat the bulb of the expansion valve to allow more valve opening, which thereby compensates for the lower upstream pressure.

With the present invention, heat pumps can be sized larger to handle more of the winter heating load. Currently, heat pumps are sized based on summer cooling requirements in order to provide good dehumidification. Larger heat pumps would have short run times in the summer with high sensible heat ratios (low amounts of dehumidification). By using the control apparatus of the present invention in a single thermostatic expansion valve heat pump system, this problem can be avoided. In the summer, the control reduces the flow of refrigerant through the expansion valve, reducing both the evaporator temperature and system capacity. At the reduced capacity and lower evaporator temperature, the heat pump system has an acceptable sensible heat ratio and a capacity well matched to the house. For heating operation, the control yields a low superheat for full evaporator utilization and good ambient following characteristics. In this way, the heat pump can be made larger, and the winter balance point where electric resistance heat must begin will be lower, thereby yielding reduced energy consumption and operating costs.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Apparatus for controlling a heating or cooling system of the type including an evaporator having an inlet line and a suction line, and a thermostatic expansion valve for controlling flow of refrigerant into the evaporator, said thermostatic expansion valve including a valve in said inlet line and a thermostatic bulb coupled to said valve, said apparatus comprising:

a thermoelectric heat pump device responsive to an electrical control signal for controlling transfer of thermal energy to and from said thermostatic bulb, said thermoelectric device being positioned between said thermostatic bulb and said suction line, and being in thermal contact with said thermostatic bulb and said suction line;

means for sensing at least one temperature associated with said heating or cooling system; and electronic control means responsive to the sensed temperature for providing said electrical control signal to said thermoelectric device for maintaining a desired operating condition of said evaporator.

2. Control apparatus as defined in claim 1 wherein said electronic control means includes means for causing said thermoelectric device to cool said thermostatic bulb when said evaporator is not in operation.

3. Control apparatus as defined in claim 1 wherein said electronic control means includes a microprocessor responsive to said sensing means.

4. Control apparatus as defined in claim 3 wherein said electronic control means further includes a driver circuit responsive to an output from said microprocessor for providing said electrical control signal.

5. Control apparatus as defined in claim 4 wherein said driver circuit is responsive to a first state of the output from said microprocessor for supplying a current of one polarity to said thermoelectric device and is responsive to a second state of the output from said microprocessor for supplying a current of the opposite polarity to said thermoelectric device.

6. Control apparatus as defined in claim 1 wherein said sensing means comprises a first temperature sensor in thermal contact with said inlet line and a second temperature sensor in thermal contact with said suction line and wherein said electronic control means includes means responsive to said first and second temperature sensors for determining a temperature difference between said suction line and said inlet line.

7. Control apparatus as defined in claim 6 wherein said electronic control means includes means for causing said thermoelectric device to cool said thermostatic bulb when said temperature difference is less than a predetermined value.

8. Control apparatus as defined in claim 6 wherein said electronic control means includes means for causing said thermoelectric device to cool said thermostatic bulb when said temperature difference is less than a first predetermined value and for causing said thermoelectric device to heat said thermostatic bulb when said temperature difference is greater than a second predetermined value.

9. Control apparatus as defined in claim 1 wherein said sensing means comprises means for sensing a temperature of the refrigerant in said evaporator.

10. Control apparatus as defined in claim 1 wherein said sensing means comprises means for sensing a temperature in a zone being controlled by said heating or cooling system.

11. Control apparatus as defined in claim 1 wherein said electronic control means includes means for causing said thermoelectric device to heat said thermostatic bulb when said evaporator is not in operation.

12. Apparatus for controlling a heating or cooling system of the type including an evaporator having an inlet line and a suction line, and a thermostatic expansion valve for controlling flow of refrigerant into the evaporator, said thermostatic expansion valve including a valve in said inlet line and a thermostatic bulb coupled to said valve, said apparatus comprising:
- a thermoelectric heat pump device responsive to an electrical control signal for controlling transfer of thermal energy to and from said thermostatic bulb, said thermoelectric device being positioned between said thermostatic bulb and said suction line so as to control transfer of thermal energy between said suction line and said thermostatic bulb;
- means for sensing at least one temperature associated with said heating or cooling system; and
- electronic control means responsive to the sensed temperature for providing said electrical control signal to said thermoelectric device for maintaining a desired operating condition of said evaporator.

13. Apparatus for controlling a heating or cooling system of the type including an evaporator having an inlet line and a suction line, and a thermostatic expansion valve for controlling flow of refrigerant into the evaporator, said thermostatic expansion valve including a valve in said inlet line and a thermostatic bulb coupled to said valve, said apparatus comprising:
- a thermoelectric heat pump device responsive to an electrical control signal for controlling transfer of thermal energy to and from said thermostatic bulb;
- means for sensing at least one temperature associated with said heating or cooling system; and
- electronic control means responsive to the sensed temperature for providing said electrical control signal to said thermoelectric device for maintaining a desired operating condition of said evaporator, said electronic control means including means for causing said thermoelectric device to cool said thermostatic bulb when said evaporator is not in operation.

14. Apparatus for controlling a heating or cooling system including an evaporator having an inlet line and a suction line, said apparatus comprising:
- a thermostatic expansion valve for controlling flow of refrigerant into the evaporator, said thermostatic expansion valve including a valve for connection in said inlet line and a thermostatic bulb coupled to said valve;
- a thermoelectric heat pump device in thermal contact with said thermostatic bulb and responsive to an electrical control signal for controlling transfer of thermal energy to and from said thermostatic bulb;
- means for sensing at least one temperature of said refrigerant;
- electronic control means responsive to the temperature of said refrigerant for providing said electrical control signal to said thermoelectric device for maintaining a desired operating condition of said evaporator; and
- means for mounting said thermostatic bulb and said thermoelectric device to said suction line such that said thermoelectric device is positioned between said thermostatic bulb and said suction line for controlling transfer of thermal energy between said suction line and said thermostatic bulb.

15. Control apparatus as defined in claim 13 wherein said mounting means includes a first element for enhancing thermal contact between said thermoelectric device and said thermostatic bulb and a second element for enhancing thermal contact between said thermoelectric device and said suction line.

16. Control apparatus as defined in claim 13 wherein said electronic control means includes a microprocessor responsive to said sensing means.

17. Control apparatus as defined in claim 16 wherein said electronic control means further includes a driver circuit responsive to an output from said microprocessor for providing said electrical control signal.

18. Control apparatus as defined in claim 17 wherein said driver circuit is responsive to a first state of the output from said microprocessor for supplying a current of one polarity to said thermoelectric device and is responsive to a second state of the output from said microprocessor for supplying a current of the opposite polarity to said thermoelectric device.

19. Control apparatus as defined in claim 14 wherein said sensing means comprises a first temperature sensor in thermal contact with said inlet line and a second temperature sensor in thermal contact with said suction line and wherein said electronic control means includes means responsive to said first and second temperature sensors for determining a temperature difference between said suction line and said inlet line.

20. Control apparatus as defined in claim 19 wherein said electronic control means includes means for causing said thermoelectric device to cool said thermostatic bulb when said temperature difference is less than a predetermined value.

21. Control apparatus as defined in claim 19 wherein said electronic control means includes means for causing said thermoelectric device to cool said thermostatic bulb when said temperature difference is less than a first predetermined value and for causing said thermoelectric device to heat said thermostatic bulb when said temperature difference is greater than a second predetermined value.

22. Control apparatus as defined in claim 14 wherein said electronic control means includes means for causing said thermoelectric device to cool said thermostatic bulb when said evaporator is not in operation.

23. Control apparatus as defined in claim 14 wherein said electronic control means includes means for causing said thermoelectric device to heat said thermostatic bulb when said evaporator is not in operation.

24. Apparatus for controlling a heating or cooling system including an evaporator having an inlet line and a suction line, said apparatus comprising:
- a thermostatic expansion valve for controlling flow of refrigerant into the evaporator, said thermostatic expansion valve including a valve for connection in said inlet line and a thermostatic bulb coupled to said valve;
- a thermoelectric heat pump device in thermal contact with said thermostatic bulb and responsive to an electrical control signal for controlling transfer of thermal energy to and from said thermostatic bulb;
- means for sensing at least one temperature of said refrigerant; and
- electronic control means responsive to the temperature of said refrigerant for providing said electrical control signal to said thermoelectric device for maintaining a desired operating condition of said evaporator, said electronic control means including means for causing said thermoelectric device to cool said thermostatic bulb when said evaporator is not in operation.

25. Apparatus for controlling a heating or cooling system of the type including an evaporator having an inlet line and a suction line, and a thermostatic expansion valve for controlling flow of refrigerant into the evaporator, said thermostatic expansion valve including a valve in said inlet line and a thermostatic bulb coupled to said valve, said apparatus comprising:
- a thermoelectric heat pump device responsive to an electrical control signal for controlling transfer of thermal energy to and from said thermostatic bulb;
- means for sensing at least one temperature associated with said heating or cooling system; and
- electronic control means responsive to the sensed temperature for providing said electrical control signal to said thermostatic device for maintaining a desired operating condition of said evaporator, said electronic control means including means for causing said thermoelectric device to heat said thermostatic bulb when said evaporator is not in operation.

26. Apparatus for controlling a heating or cooling system of the type including an evaporator having an inlet line and a suction line, and a thermostatic expansion valve for controlling flow of refrigerant into the evaporator, said thermostatic expansion valve including a valve in said inlet line and a thermostatic bulb coupled to said valve, said apparatus comprising:
- a thermoelectric heat pump device responsive to an electrical control signal for controlling transfer of thermal energy to and from said thermostatic bulb, said thermoelectric device being positioned between said thermostatic bulb and said evaporator so as to control transfer of thermal energy between said evaporator and said thermostatic bulb;
- means for sensing at least one temperature associated with said heating or cooling system; and
- electronic control means responsive to the sensed temperature for providing said electrical control signal to said thermoelectric device for maintaining a desired operating condition of said evaporator.

27. Apparatus for controlling a heating or cooling system of the type including an evaporator having an inlet line and a suction line, and a thermostatic expansion valve for controlling flow of refrigerant into the evaporator, said thermostatic expansion valve including valve in said inlet line and a thermostatic bulb coupled to said valve, said apparatus comprising:
- a thermostatic heat pump device responsive to an electrical control signal for controlling transfer of thermal energy to and from said thermostatic bulb, said thermoelectric device being positioned between said thermostatic bulb and a heat sink or a heat source so as to control transfer of thermal energy between said heat sink or heat source and said thermostatic bulb;
- means for sensing at least one temperature associated with said heating or cooling system; and
- electronic control means responsive to the sensed temperature for providing said electrical control signal to said thermoelectric device for maintaining a desired operating condition of said evaporator.

* * * * *